United States Patent
Liu et al.

(10) Patent No.: US 7,592,379 B2
(45) Date of Patent: Sep. 22, 2009

(54) OIL-BASED DISPERSING METHOD OF DRAG REDUCTION POLYMERS

(75) Inventors: Bing Liu, Beijing (CN); Xuchen Bao, Beijing (CN); Yanqing Gao, Beijing (CN); Chunman Li, Beijing (CN); Guoping Li, Beijing (CN)

(73) Assignee: PetroChina Company Limited, Beijing (CN)

( * ) Notice: Subject to any disclaimer, the term of this patent is extended or adjusted under 35 U.S.C. 154(b) by 120 days.

(21) Appl. No.: 11/479,868

(22) Filed: Jun. 30, 2006

(65) Prior Publication Data

US 2007/0004837 A1 Jan. 4, 2007

(30) Foreign Application Priority Data

Jul. 1, 2005 (CN) ............ 2005 1 0080245

(51) Int. Cl.
*B05D 5/08* (2006.01)
*C08L 25/08* (2006.01)
*C08L 91/00* (2006.01)
*C08K 3/26* (2006.01)

(52) U.S. Cl. ............ 523/175; 524/578; 524/313; 524/425

(58) Field of Classification Search ......... 523/175; 524/313, 322, 318, 400, 490, 578, 425; 137/13
See application file for complete search history.

(56) References Cited

U.S. PATENT DOCUMENTS 3,736,288 A * 5/1973 Stratta et al. ............ 523/175
4,190,069 A * 2/1980 Krantz ............ 137/13
4,527,581 A * 7/1985 Motier ............ 137/13
5,229,295 A * 7/1993 Travis ............ 436/39
5,376,697 A * 12/1994 Johnston et al. ............ 523/175
6,576,732 B1 * 6/2003 Milligan et al. ............ 526/347
2002/0173569 A1 * 11/2002 Karhu et al. ............ 524/313

FOREIGN PATENT DOCUMENTS

JP  54-89039  * 7/1979
JP  2-302457  * 12/1990
WO  WO 03/076482 A1 * 9/2003

OTHER PUBLICATIONS

JP 54-89039 (Jul. 1979) abstract in English.*

* cited by examiner

*Primary Examiner*—David Wu
*Assistant Examiner*—Rip A. Lee
(74) *Attorney, Agent, or Firm*—Chapman and Cutler LLP

(57) ABSTRACT

An oil-based suspension-dispersion system of drag reduction polymers and the method for preparing same, characterized in adding 0.001-0.1 wt % of ultraviolet absorber and 0.001-0.1 wt % of bactericide into 50-90 wt % of vegetable oil and then mixing the obtained mixture to be homogeneous for use as dispersant, adding 2-25 wt % of separant into 10-40% of extra-high-molecular α-olefin-styrene polymer based drag reduction polymer and crushing them into powders at a temperature of lower than −90° C., based on the total weight of the suspension-dispersion system, and then adding the obtained mixture into the dispersant and stirring the mixture by using a high speed emulsion machine to make the mixture homogeneous and emulsified. The system offers a low viscosity of the suspended dispersion system, a high solid content up to 35%; improved high temperature resistance performance, higher flash point, improved safety, and good stability in storage.

12 Claims, No Drawings

OIL-BASED DISPERSING METHOD OF DRAG REDUCTION POLYMERS

FIELD OF THE INVENTION

This invention relates to compositions of high molecular compounds and pipeline systems, and in particular relates to an oil-based dispersing method of drag reduction polymers used to reduce the drag in oil pipelines.

BACKGROUND OF THE INVENTION

An α-olefin polymer with extra high molecular is usually used for drag reduction polymers. However, the α-olefin polymer with extra high molecular obtained by mass polymerization technique is in the shape of viscoelastic chunks and therefore cannot be directly used in oil pipelines, and it can be used only after it is deep frozen and crushed into powder-like particles and dissolved or dispersed by a liquid solvent. Currently, there are quite many dispersion methods in wide use that offer good results, including the cellosolve-straight chain alcohol dispersion process provided in the invention of "A Suspension-dispersion Process of α-Olefin-Styrene Polymer with Extra High Molecular" (Application Number CN03 109630.1) filed by our company on 10 Apr. 2003, which uses cellosolve in place of water to adjust the density of the dispersion system, thereby avoiding the swelling effect of water, significantly improving the stability of the suspended dispersion system, increasing the content of effective saline components, and providing excellent low temperature resistance performance; but one disadvantage is that its high temperature resistance performance is still not good enough to be used during the summertime or in high temperature regions.

SUMMARY OF INVENTION

The purpose of this invention is to provide an oil-based suspension-dispersion system of drag reduction polymers and the method for preparing same, which offers high solid content and low viscosity, and improves the high temperature performance and suspension stability of the suspended dispersion system.

Although this invention also uses the method of adding dispersant into a newly crushed drag reduction polymer and stirring them, it is characterized in providing a new dispersant and a new processing method, i.e. adding a slight amount of ultraviolet absorber and bactericide into the vegetable oil and mixing them to be homogeneous for use as dispersant; adding the powder, obtained by crushing at a low temperature the drag reduction polymer added with separant, into the dispersant and stirring them; and the whole process is completed once the mixture is homogeneous. Specifically, this invention involves adding 0.001-0.1 wt % of ultraviolet absorber and 0.001-0.1 wt % of bactericide into the vegetable oil which takes up 50-90% of the total weight of the suspension-dispersion system to obtain a first mixture and then mixing the first mixture to be homogeneous, adding 2-25 wt % of separant into the drag reduction polymer of extra-high-molecular α-olefin-styrene polymer which takes up 10-40% of the total weight of the suspension-dispersion system to obtain a second mixture, and crushing the second mixture into powders at a temperature of lower than −90° C., and then adding the said powders into the dispersant and stirring the mixture, for example by a high speed emulsion machine, to make it emulsified. The suspension-dispersion system of the invention is thus obtained.

The separant used herein is magnesium stearate, calcium stearate, zinc stearate, stearic acid, polyethylene wax, polyvinyl chloride paste, activated argil, activated diatomite, activated calcium carbonate, activated carbon white, or mixtures thereof. The vegetable oil is arachis oil, soybean oil, corn oil, sunflower seed oil, rape seed oil, cotton seed oil, palm oil, olive oil, benne oil, sesame oil, or mixtures thereof. The ultraviolet absorber is UV-9, UV-531, UV-326, or mixtures thereof. The bactericide is WT-307B bactericide algicide (disulfocyanomethane). In order to improve the appearance of the dispersion system, colorant that accounts for 0.001-0.01% of the total weight can be additionally added into the dispersant, and the said colorant may be methylene blue.

In this invention, the vegetable oil is used as the predominant component of dispersant, into which a slight amount of ultraviolet absorber is added to avoid degradation of the drag reduction polymer, a slight amount of bactericide is added to prevent the vegetable oil from deterioration, and a slight amount of colorant is added to improve the appearance of the dispersion system, so that the inherent property of the vegetable oil, i.e. excellent high temperature resistance performance, can serve a great function. In this method, because separant is used to adjust the density of the drag reduction polymer powder and the density of the vegetable oil, the difference in density, although there is still some, is already very small. In particular, because the viscosity of the oil-based suspended dispersion system produced using this method is relatively high (compared to that of the cellosolve-straight chain alcohol dispersion system), and because the density of dispersant is very close to that of dispersate, the stratification phenomenon is not obvious so that the suspension-dispersion system can be stored stably for six months, beyond which a slight amount of stratification, even if possibly present, will not adversely affect use in the field.

EMBODIMENTS

The following four Examples are used to illustrate the specific embodiments of this invention in detail.

EXAMPLE 1

620 kg of soybean oil, 0.1 kg of UV-9 ultraviolet absorber, 0.001 kg of bactericide disulfocyanomethane were weighed and taken, the obtained mixture was put into a 2 $m^3$ agitator tank, stirred to be homogeneous for use as dispersant. 320 kg of extra-high-molecular α-olefin-styrene polymer and 60 kg of calcium stearate separant were crushed into powders at a temperature of −90° C. and were added subsequently into the dispersant, and the high speed emulsion machine in the agitator tank was started up to stir the mixture to be homogeneous once again, and a blue suspended dispersion system with a polymer solid content of 32% was thus obtained. The said suspended dispersion system can be stored stably for six months, whose flash point was 115° C., and the relationship between its viscosity and temperature was given below in table 1:

TABLE 1

| | Temp/° C. | | | | | | | |
|---|---|---|---|---|---|---|---|---|
| | 10 | 20 | 30 | 40 | 50 | 60 | 70 | 80 |
| Viscosity/pa·s | 0.422 | 0.363 | 0.308 | 0.326 | 0.376 | 0.435 | 0.636 | 0.948 |

EXAMPLE 2

670 kg of corn oil, 0.1 kg of UV-531 ultraviolet absorber, 0.1 g of disulfocyanomethane bactericide, and 0.001 kg of methylene blue colorant were weighed and taken, the obtained mixture was put into a 2 m³ agitator tank, and stirred to be homogeneous for use as dispersant. 280 kg of extra-high-molecular α-olefin-styrene polymer and 50 kg of activated calcium carbonate separant were crushed into powders at a temperature of −92° C., and added into the dispersant in the agitator tank. The high speed emulsion machine was started up to stir the mixture to be homogeneous once again, and a blue suspended dispersion system with a polymer solid content of 32% was thus obtained. The said suspended dispersion system can be stored stably for six months, whose flash point was 118° C., and the relationship between its viscosity and temperature was given below in table 2:

TABLE 2

| | Temp/° C. | | | | | | | |
|---|---|---|---|---|---|---|---|---|
| | 10 | 20 | 30 | 40 | 50 | 60 | 70 | 80 |
| Viscosity/pas | 0.450 | 0.425 | 0.389 | 0.459 | 0.509 | 0.620 | 0.785 | 1.104 |

EXAMPLE 3

900 kg of palm oil, 0.1 kg of UV-9 ultraviolet absorber, 0.001 kg of bactericide disulfocyanomethane were weighed and taken, the obtained mixture was put into a 2 m³ agitator tank, stirred to be homogeneous for use as dispersant. 80 kg of extra-high-molecular α-olefin-styrene polymer and 20 kg of calcium stearate separant were crushed into powders at a temperature of −90° C. and were added subsequently into the dispersant, and the high speed emulsion machine in the agitator tank was started up to stir the mixture to be homogeneous once again, and a blue suspended dispersion system with a polymer solid content of 8.5% was thus obtained. The said suspended dispersion system can be stored stably for six months, whose flash point was 120° C., and the relationship between its viscosity and temperature was given below in table 3:

TABLE 3

| | Temp/° C. | | | | | | | |
|---|---|---|---|---|---|---|---|---|
| | 10 | 20 | 30 | 40 | 50 | 60 | 70 | 80 |
| Viscosity/pa·s | 0.383 | 0.323 | 0.298 | 0.316 | 0.358 | 0.405 | 0.606 | 0.908 |

EXAMPLE 4

550 kg of olive oil, 0.1 kg of UV-531 ultraviolet absorber, 0.1 g of disulfocyanomethane bactericide, and 0.001 kg of methylene blue colorant were weighed and taken, the obtained mixture was put into a 2 m³ agitator tank, and stirred to be homogeneous for use as dispersant. 380 kg of extra-high-molecular α-olefin-styrene polymer and 70 kg of activated calcium carbonate separant were crushed into powders at a temperature of −92° C., and added into the dispersant in the agitator tank. The high speed emulsion machine was started up to stir the mixture to be homogeneous once again, and a blue suspended dispersion system with a polymer solid content of 38% was thus obtained. The said suspended dispersion system can be stored stably for six months, whose flash point was 118° C., and the relationship between its viscosity and temperature was given below in table 4:

TABLE 4

| | Temp/° C. | | | | | | | |
|---|---|---|---|---|---|---|---|---|
| | 10 | 20 | 30 | 40 | 50 | 60 | 70 | 80 |
| Viscosity/pas | 0.670 | 0.644 | 0.592 | 0.633 | 0.709 | 0.802 | 1.005 | 1.254 |

In addition to good fluidity, i.e. low viscosity, of the suspended dispersion system, this method of the invention offers a high solid content up to 35 wt %; improves the high temperature resistance performance of the drag reduction polymer based suspended dispersion system to enlarge its operational range to 10-70° C.; provides a flash point higher than 107° C., i.e. significantly raises the flash point of the suspended dispersion system, such that improves the safety properties of the drag reduction polymer based suspended dispersion system during transportation and storage; eliminates the odor of the alcoholic suspended dispersion system and improves the operating environment; and offers good stability so that it can be stably stored for more than six months. The oil-based suspended dispersion system of drag reduction polymer produced by the present method can complement to each other with the existing cellosolve-straight chain alcohol dispersion system, which can be used in high temperature and low temperature environments, respectively.

What is claimed is:

1. An oil-based suspension-dispersion system of drag reduction polymers, comprising:
   50-90 wt % of vegetable oil,
   0.001-0.1 wt % of ultraviolet absorber,
   0.001-0.1 wt % of bactericide,
   5-40% of α-olefin-styrene polymer based drag reduction polymer, and
   2-25 wt % of activated calcium carbonate;
   based on total weight of the suspension-dispersion system.

2. The oil-based suspension-dispersion system according to claim 1, wherein the vegetable oil is selected from the group consisting of arachis oil, soybean oil, corn oil, sunflower seed oil, rape seed oil, cotton seed oil, palm oil, olive oil, benne oil, sesame oil, and mixtures thereof.

3. The oil-based suspension-dispersion system according to claim 1, wherein the ultraviolet absorber is selected from the group consisting of 2-hydroxy-4-methoxybenzophenone, 2-hydroxy-4-n-octoxy-benzophenone, 2-(2'-hydroxy-3'-tert-butyl-5'-methylphenyl)-5-chloro benzotnazole, and mixtures thereof.

4. The oil-based suspension-dispersion system according to claim 1, wherein the bactericide is methylene bithiocyanate.

5. The oil-based suspension-dispersion system according to claim 1, wherein a colorant in an amount of 0.001-0.01 wt % based on the total weight of the suspension-dispersion system is added into the dispersant.

6. The oil-based suspension-dispersion system according to claim 5, wherein the colorant is methylene blue.

7. A method for preparing oil-based suspension-dispersion system of drag reduction polymers, comprising following a sequence of:
   adding 0.001-0.1 wt % of ultraviolet absorber and 0.001-0.1 wt % of bactericide into 50-90 wt % of vegetable oil to obtain a first mixture, and then mixing the first mixture to be homogeneous, for use as dispersant, based on total weight of the suspension-dispersion system;

adding 2-25 wt % of activated calcium carbonate into 5-40 wt % of a high molecular weight α-olefin-styrene polymer based drag reduction polymer based on the total weight of the suspension-dispersion system to obtain a second mixture, and crushing the second mixture into powders at a temperature of −90° C.; and adding said powders into the dispersant and stirring to make them emulsified.

8. The method according to claim 7 wherein the vegetable oil is selected from the group-consisting of arachis oil, soybean oil, corn oil, sunflower seed oil, rape seed oil, cotton seed oil, palm oil, olive oil, benne oil, sesame oil, and mixtures thereof.

9. The method according to claim 7, wherein the ultraviolet absorber is selected from the group consisting of 2-hydroxy4-methoxybenzophenone, 2-hydroxy-4-n-octoxy-benzophenone, 2-(2'-hydroxy-3'-tert-butyl -5'-methyl phenyl)-5-chloro benzotriazole, and mixtures thereof.

10. The method according to claim 7, wherein the bactericide is methylene bithiocyanate.

11. The method according to claim 7, wherein a colorant in an amount of 0.001-0.01 wt % based the total weight of the suspension-dispersion system is added into the dispersant.

12. The method according to claim 11, wherein the colorant is methylene blue.

\* \* \* \* \*